(12) United States Patent
Dischinger

(10) Patent No.: US 8,208,024 B2
(45) Date of Patent: Jun. 26, 2012

(54) COMMUNICATION AND SURVEILLANCE SYSTEM

(75) Inventor: Craig A. Dischinger, Maple Grove, MN (US)

(73) Assignee: Target Brands, Inc., Minneapolis, MN (US)

( * ) Notice: Subject to any disclaimer, the term of this patent is extended or adjusted under 35 U.S.C. 154(b) by 1182 days.

(21) Appl. No.: 11/948,020

(22) Filed: Nov. 30, 2007

(65) Prior Publication Data

US 2009/0141129 A1    Jun. 4, 2009

(51) Int. Cl.
*H04N 7/18* (2006.01)
(52) U.S. Cl. .............. 348/158; 348/14.01; 348/14.05; 348/14.07; 348/142; 348/143
(58) Field of Classification Search .............. 348/158, 348/14.01, 14.05, 14.07, 142–143
See application file for complete search history.

(56) References Cited

U.S. PATENT DOCUMENTS

| | | | |
|---|---|---|---|
| 1,700,440 A | 1/1929 | Lord | |
| D339,365 S | 9/1993 | Urcuilio | D16/203 |
| 5,342,054 A * | 8/1994 | Chang et al. | 473/156 |
| 5,400,185 A | 3/1995 | Scerbo, III | 360/5 |
| 5,594,498 A | 1/1997 | Fraley | 348/158 |
| D377,940 S | 2/1997 | Totsch | D16/202 |
| 5,726,660 A | 3/1998 | Purdy et al. | 342/357 |
| 5,793,419 A | 8/1998 | Fraley | 348/143 |
| 5,809,237 A | 9/1998 | Watts et al. | 395/200.32 |
| 5,886,739 A | 3/1999 | Winningstad | 348/158 |
| D477,342 S | 7/2003 | Yeh | D16/202 |
| 6,791,598 B1 * | 9/2004 | Luken et al. | 348/36 |
| D501,495 S | 2/2005 | Stock | D16/203 |
| D504,904 S | 5/2005 | Nagai et al. | D16/203 |
| 6,891,566 B2 | 5/2005 | Marchese | 348/211.3 |
| 6,934,461 B1 | 8/2005 | Strub et al. | 386/46 |

(Continued)

FOREIGN PATENT DOCUMENTS

KR        1068717 A        7/2001

(Continued)

OTHER PUBLICATIONS

"Wireless color pen camera with DVR receiver monitor" accessed at http://www.4hiddenspycameras.com/wicopencawid.html (as of May 30, 2007).

(Continued)

*Primary Examiner* — Emmanuel L Moise
*Assistant Examiner* — Waseem Ashraf
(74) *Attorney, Agent, or Firm* — Griffiths & Seaton PLLC

(57) ABSTRACT

A surveillance and communication system is provided and includes two-way audio communication capabilities and a covert video acquisition system. In one embodiment, a system for acquiring video data within an environment is provided. The system includes a device having an image acquisition component, an audio acquisition component, and a speaker provided within an enclosure that is configured to be mounted to a portion of a user. The image acquisition component is configured to be utilized to acquire video data from a first viewpoint within the environment. A local data communication system is configured to receive an electrical signal indicative of video data from the image acquisition component. A surveillance component is fixed to a structure within the environment and configured to acquire video data from a second viewpoint within the environment that is elevated with respect to the first viewpoint. Further, a remote data communication system is provided that is remote from the device and configured to simultaneously receive video data from the local data communication system and video data from the surveillance component.

21 Claims, 7 Drawing Sheets

U.S. PATENT DOCUMENTS

| | | | |
|---|---|---|---|
| 7,139,014 B1 | 11/2006 | Kim et al. | 348/14.01 |
| 7,508,941 B1* | 3/2009 | O'Toole et al. | 380/228 |
| 7,543,327 B1* | 6/2009 | Kaplinsky | 725/105 |
| 2002/0105598 A1* | 8/2002 | Tai et al. | 348/705 |
| 2004/0041904 A1* | 3/2004 | Lapalme et al. | 348/14.08 |
| 2004/0216165 A1* | 10/2004 | Inata et al. | 725/105 |
| 2005/0018073 A1* | 1/2005 | Pilu | 348/375 |
| 2005/0100087 A1* | 5/2005 | Hasegawa et al. | 375/240.01 |
| 2005/0243191 A1* | 11/2005 | Itoh et al. | 348/231.99 |
| 2005/0275721 A1* | 12/2005 | Ishii | 348/159 |
| 2006/0048286 A1* | 3/2006 | Donato | 2/422 |
| 2006/0055786 A1* | 3/2006 | Ollila | 348/207.99 |
| 2006/0253885 A1* | 11/2006 | Murphy et al. | 725/105 |
| 2007/0052804 A1* | 3/2007 | Money et al. | 348/143 |
| 2007/0111754 A1 | 5/2007 | Marshall et al. | 455/556.1 |
| 2007/0154194 A1* | 7/2007 | Yoon et al. | 396/50 |
| 2007/0189612 A1* | 8/2007 | Takahashi et al. | 382/229 |
| 2007/0271122 A1* | 11/2007 | Zaleski | 705/3 |
| 2007/0285222 A1* | 12/2007 | Zadnikar | 340/509 |
| 2008/0084473 A1* | 4/2008 | Romanowich | 348/135 |
| 2008/0088706 A1* | 4/2008 | Girgensohn et al. | 348/207.99 |
| 2008/0101789 A1* | 5/2008 | Sharma | 396/427 |
| 2008/0259158 A1* | 10/2008 | Flint et al. | 348/143 |
| 2008/0291279 A1* | 11/2008 | Samarasekera et al. | 348/159 |
| 2009/0040308 A1* | 2/2009 | Temovskiy | 348/158 |
| 2009/0207246 A1* | 8/2009 | Inami et al. | 348/135 |

FOREIGN PATENT DOCUMENTS

WO    WO 2006/081053 A2    8/2006

OTHER PUBLICATIONS

"Wearable handsfree mini digital DVR recorder & camera" accessed at http://www.4hiddenspycameras.com/wehamididvrr.html (as of May 30, 2007).

"Omnicast Overview," accessed at http://www.genetec.com/english/solutions/omnicast/overview.aspx (as of Nov. 26, 2007).

"Effective Multi-Agency Emergency Response—The Un-tethered Officer," Mitretek Systems Technical Report MTR 2004-19 (Dec. 2004).

"ERS VIDMIC Features and Specs" accessed at http://www.ehsequipment.com/vidmic/pdfs/VIDMICeBrochure.pdf (as of Nov. 8, 2007).

"EarphoneTek/MP3 Covert Video System," accessed at http://www.pimall.com/nais/earphonetek.html (as of Jun. 6, 2007).

* cited by examiner

COMMUNICATION AND SURVEILLANCE SYSTEM

BACKGROUND

There are known systems for acquiring video data using a covert camera. Many of these conventional systems utilize a small-scale camera that is hidden within an object and configured to record video. Further, some conventional personal surveillance systems provide a user-carried microphone and separate camera for acquiring audio and video data of an environment surrounding the user and transmitting the acquired audio and video data to a remote location. Unfortunately, the capabilities and utility of these current systems are limited.

In the context of an application involving security and/or law enforcement personnel, it is often desirous for the personnel to communicate with a remote station utilizing two-way audio communication. Typically, the two-way audio communication is facilitated using a radio that is carried by the security or law enforcement officer. In some applications, this radio includes a handset that is mounted to the chest or shoulder of the user. The handset includes a speaker that provides audio signals to the user and a microphone that can be activated by a button to send audio signals to the remote station.

Security and law enforcement personnel who wear uniforms to indicate that they are part of a security team or a law enforcement entity have not relied on covert cameras because there is no need to hide the fact that they are collecting information about people or events. In fact, in many settings, especially retail settings, cameras are openly displayed to try to dissuade criminal activity by making it clear that such activity may be captured by a camera. In addition, because of the large number of cameras found in a retail setting, there would not appear to be any need for using additional covert cameras, which are expensive and often require personnel to carry additional equipment.

Further, in some settings, especially retail settings, surveillance cameras are utilized that are fixed to a structure within the environment, such as a ceiling, floor, or wall of a building. Unfortunately, even though many of these settings utilize multiple cameras, dark areas (i.e., areas that are blocked from view from at least one camera) remain. Further, sophisticated people may know or recognize where the surveillance cameras are positioned and thus be able locate dark areas in which to perform actions such that their actions will not be captured by the surveillance cameras.

The discussion above is merely provided for general background information and is not intended to be used as an aid in determining the scope of the claimed subject matter.

SUMMARY

A surveillance and communication system is provided and includes two-way audio communication capabilities and a covert video acquisition system. In one embodiment, a system for acquiring video data within an environment is provided. The system includes a device having an image acquisition component, an audio acquisition component, and a speaker provided within an enclosure that is configured to be mounted to a portion of a user. The image acquisition component is configured to be utilized to acquire video data from a first viewpoint within the environment. A local data communication system is configured to receive an electrical signal indicative of video data from the image acquisition component. A surveillance component is fixed to a structure within the environment and configured to acquire video data from a second viewpoint within the environment that is elevated with respect to the first viewpoint. Further, a remote data communication system is provided that is remote from the device and configured to simultaneously receive video data from the local data communication system and video data from the surveillance component.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

The concepts described herein are directed to a surveillance and communication system for acquiring and transmitting audio and image data. The system includes a device configured to be operated by a user. This device includes an enclosure housing a camera, microphone, and speaker. The microphone and speaker provide two-way audio communication with the user. The camera enables acquisition of image data.

In one example, the surveillance and communication system includes a two-way security radio having a speaker, microphone, and video camera provided in a device worn by a security officer. The system can be used by law enforcement and security personal, for example, to acquire video data of criminal activity or an interaction with a subject. For instance, the system is useful in a retail store environment to capture video data of a subject as well as the actions and conduct of the officer operating the device. The video data captured by the device is provided to a control room, which receives video from other cameras at the same time that it is receiving data from the device. Together, these sources of video data provide increased video coverage of an environment, thereby making it easier for personnel in the control room to monitor the environment.

Figure 1:
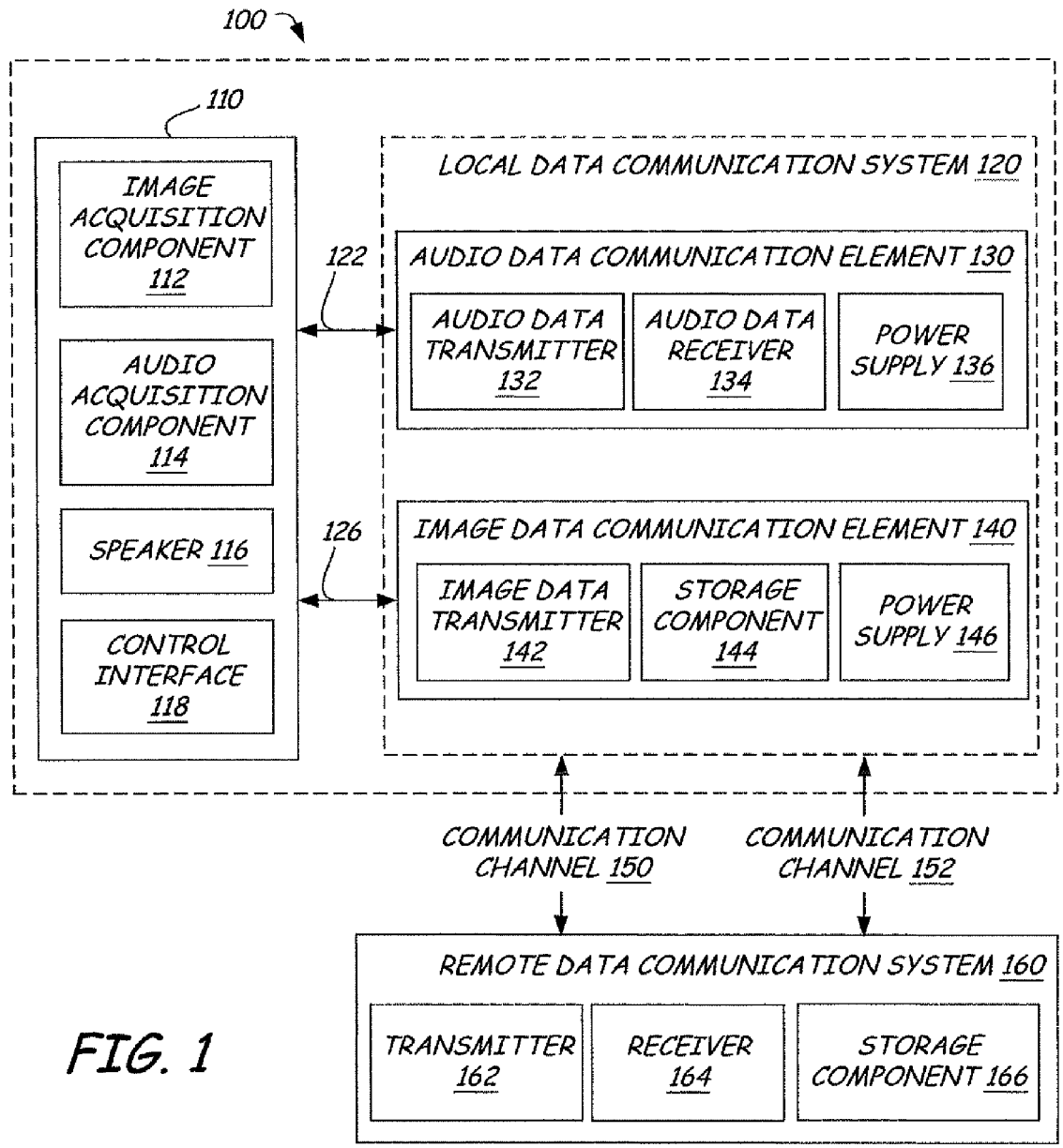
FIG. 1 is a schematic diagram illustrating a communication and surveillance system for acquiring image and audio data.

FIG. 1 illustrates one embodiment of a communication and surveillance system 100. In one embodiment, communication and surveillance system 100 is a personal audio/video surveillance system configured to be utilized by security and/or law enforcement personnel to provide both two-way audio communication with a remote station (or other personnel) and acquire image data covertly. For instance, system 100 can be utilized to acquire video of a person, object, and/or event of interest. However, this is one example of system 100 and is not intended to limit the scope of the concepts described herein. System 100 can, for example, be utilized in many other data acquisition contexts.

System 100 includes an image acquisition component 112, audio acquisition component 114, and speaker 116 provided within an enclosure 110. Image acquisition component 112 and audio acquisition component 114 are communicatively coupled to local data communication system 120. Image acquisition component 112 and audio acquisition component 114 are configured to acquire image data and audio data, respectively, and are configured to provide the acquired data to local data communication system 120. The image data and/or audio data can be stored locally on a storage component associated with local data communication system 120. Alternatively, the image data and/or audio data can be communicated over a communication channel to a remote data communication system 160. For example, audio data can be transmitted over a communication channel 150 and image data can be transmitted over a communication channel 152. In one embodiment, the audio data and image data are transmitted over the same communication channel.

Image acquisition component 112 is configured to receive an optical signal (i.e., light) at an input and generate a corresponding electrical signal indicative of the optical signal. In one embodiment, image acquisition component 112 is a camera configured to acquire still images and/or video data. Image acquisition component 112 can be any suitable device for acquiring image data. For example, image acquisition component 112 can be an optical sensor configured to receive an optical image and convert the optical image to a digital representation. In another example, image acquisition component 112 can be a digital sensor configured to acquire image data digitally. In one particular embodiment, image acquisition component 112 includes a CMOS sensor. Preferably, image acquisition component 112 is a small device such that it can be covertly mounted within housing 110. The electrical signal generated by image acquisition component 112 is provided over a communication channel 126 to local data communication system 120, described in further detail below. Communication channel 126 can be a wireless or a wired connection. In one embodiment, a power connection is provided between local data communication system 120 and housing 110 for supplying power to image acquisition component 112.

Image acquisition component 112 can acquire images at any suitable resolution. In one example, image data acquired by component 112 is a Common Intermediate Format (CIF) and has a resolution of 352×288 pixels. In another embodiment, component 112 has a resolution of one quarter (¼) CIF (i.e., approximately 176×144 pixels). In another embodiment, component 112 has a resolution of 120×60 pixels. In another example, image acquisition component 112 has a resolution up to 640×480 pixels or greater.

Further yet, image acquisition component 112 can acquire image data at any suitable frame rate. For example, image data can be captured at a frame rate of 1 frame per 3 seconds. In another example, image acquisition component 112 acquires image data at thirty (30) frames per second or greater. Image acquisition component 112 can also be configured to acquire images in either color or black-and-white.

Audio acquisition component 114 is configured to receive an audio signal at an input and generate a corresponding electrical signal indicative of the audio signal. In one embodiment, audio acquisition component 114 includes a microphone mounted within housing 110. For example, audio acquisition component 114 can by any suitable microphone including, but not limited to, an electret condenser. The electrical signal generated by audio acquisition component 114 is provided over a communication channel 122 to local data communication system 120. Communication channel 122 can be a wireless or a wired connection. In one embodiment, a power connection is provided between local data communication system 120 and housing 110 for supplying power to audio acquisition component 114.

Speaker 116 is also provided within enclosure 110 and is communicatively coupled to local data communication system 120. Speaker 116 is an audio rendering component configured to receive an electrical signal from local data communication system 120 and generate a corresponding audio signal. As such, audio acquisition component 114 and speaker 116 can provide two-way audio communication. In one embodiment, the electrical signal received by speaker 116 can be provided from local data communication system 120 over communication channel 122, which can be either a wireless or a wired connection.

Further, a control interface 118 can be provided and configured to control operation of components within housing 110. For example, interface 118 can be a button or switch configured to control speaker 116 and/or audio acquisition component 114. In one embodiment control interface 118, audio acquisition component 114, and speaker 116 operate in a push-to-talk (PTT), or press-to-transmit, configuration. For example, a two-way radio can be provided using a momentary button to switch from audio reception mode to audio transmit mode. Further, control interface 118 can also be configured to control operation of image acquisition 112. For example, control interface 118 can include a button or a switch for activating/deactivating image acquisition component 112. Such a button may be a physical button or a "soft" button realized on a display using software.

In the illustrated embodiment, local data communication system 120 includes an audio data communication element 130 and an image data communication element 140. The electrical signal containing audio data provided by audio acquisition component 114 is communicated to audio data communication element 130 over communication channel 122. The audio data can be stored on a storage component (not shown in FIG. 1) associated with audio data communication element 130. Audio data communication element 130 includes an audio data transmitter 132 configured to provide the audio data to a remote data communications system 160 over communication channel 150.

Further, audio data communication element 130 receives audio data at an audio data receiver 134 via a signal transmitted over communication channel 150 from remote data communication system 160. As discussed above, the received audio data from remote data communication system 160 can be provided to speaker 116 to provide audio communication between remote data communication system 160 and a user operating system 100. Communication channel 150 can be a wireless or wired connection, and can comprise transmitting a radio signal or a digital signal, to name a few.

A power supply 136 can be provided with audio data communication element 130 and can be configured to provide power for transmitter 132 and receiver 134. Further, power can be transmitted to housing 110 to power audio acquisition component 114 and/or speaker 116. Examples of power supply 136 include but are not limited to a battery pack.

The electrical signal containing image data provided by image acquisition component 112 is communicated to image data communication element 140 over communication channel 126. Image data communication element 140 can include an image data transmitter 142 configured to transmit the image data to remote communication system 160 over communication channel 152. In one embodiment, image data transmitter 142 is configured to utilize 802.11, or Wi-Fi, communications protocol for transmitting the image data over communication channel 152. However, it is noted that any suitable wireless sensor or computer network protocols can be utilized. For example, communication channel 152 can be a wireless connection such as wireless LAN, Bluetooth, or GSM data. Further, cellular technology such as 3G can be utilized. Further, it is noted that communication channel 152 can be a wired connection. The transmitted image data can be stored on a storage component 166 associated with remote data communication system 160.

In accordance with one embodiment, local data communication system 120 is configured to provide streaming media to remote data communication system 160. For instance, in one embodiment video data acquired by image acquisition component 112 can be provided to remote data communication 160 in a substantially continuous and real-time manner. Local data communication system 120 receives a first portion of video data from image acquisition component 112 and transmits the first portion of video data to the remote data communication system 160 as image acquisition component 112 continues to acquire additional video data. As such, local data communication system 120 can provide live streaming video to remote data communication system 160. Additionally, the video stream provided from image data communication element 140 to remote data communication system 160 can be provided concurrently with two-way audio transmission between audio data communication element 130 and remote data communication system 160.

In one embodiment, communication channel 152 and communication channel 150 are separate communication channels. In another embodiment, the image data is transmitted to remote communication system 160 utilizing the same communication channel as the transmitted audio data (e.g., communication channel 150).

In another embodiment, the image data received from image acquisition component 112 can be stored on a storage medium in storage component 144 within local data communication system 120. Storage component 144 can include, for example, a digital video recorder (DVR). In one embodiment, storage component 144 is a solid-state DVR.

Storage component 144 can be configured to operate in a circular data memory mode wherein storage component 144 writes data to a plurality of data storage locations in a sequential manner. Once data is written to all memory locations, storage component 144 returns to a previously written storage location and begins to overwrite the previously stored data. Additionally, storage component 144 can be configured to be removed from local data communication system 120. In this manner, the storage medium can be removed such that the data stored within storage component 144 is maintained. For example, when storage component 144 is operating in a circular memory mode, storage component 144 can be removed such that previously recorded data is not overwritten. Further, the storage component 144 can be removed to provide the recorded data to another process or application. Examples can include removing the storage medium once all memory locations have been written to and/or after a segment of image data of interest has been recorded, such as a specific event of interest.

A power supply 146 associated with image data communication element 140 can be provided and configured to supply power to storage component 144 and/or image data transmitter 142. Further, power supply 146 can also be configured to supply power to housing 110 to operate image acquisition component 112. Examples of power supply 146 include but are not limited to battery packs.

Although not illustrated in FIG. 1, local data communication system 120 can include a control interface configured to control operation of components within local data communication system 120. For example, a button or switch can be provided to activate/deactivate audio data communication element 130 and/or image data communication element 140. In one example, an on/off switch is provided to activate/deactivate image acquisition. For instance, a control mechanism can deactivate/activate image data transmitter 142 and/or storage component 144.

In the illustrated embodiment, audio data communication element 130 and image data communication element 140 are provided in separate housings. However, in other embodiments audio data communication element 130 and image data communication element 140 can be provided in the same housing. Further, it is noted that while audio data communication element 130 and image data communication element 140 are illustrated in FIG. 1 as including separate components, audio data communication element 130 and image data communication element 140 can include shared resources. For example, elements 130 and 140 can include a single shared power supply. Additionally, a shared storage component can be utilized to store both audio and image data. Further yet, elements 130 and 140 can be configured to utilize a shared data transmitter and/or a shared data receiver to send and receive data.

As discussed above, remote data communication system 160 is configured to receive data from local data communication system 120. In one example, remote data communication system 160 is a control center that monitors and/or renders data received from communication system 120. For example, remote data communication system 160 can include a monitor, or an array of monitors, for visually rendering image data. Remote communication system 160 can also include a microphone for acquiring audio data to send to local data communication system 120 and a speaker for audibly rendering audio data received from local data communication system 120. Although a single transmitter 162 and a single receiver 164 are illustrated within remote data communication system 160, it is noted that multiple transmitters and multiple receivers can be utilized. For example, a first data transmitter and a first data receiver can be provided to transmit and receive audio data and a second data transmitter and a second data receiver can be provided to transmit and receive image data.

Further, remote data communication system 160 can be configured to communicate audio and/or image data with a plurality of devices. For instance, in one embodiment, remote data communication system 160 receives video data from system 100 and at least one additional video source. Additional video sources can include image acquisition devices configured to be worn by a user, such as additional devices that are substantially similar to system 100, as well as fixed image acquisition devices. Fixed image acquisition devices are devices that are mounted to a structure that is stationary, such as a part of a building, a post, a support, etc. Further, fixed image acquisition devices can include a motor to actuate rotation of the device about an axis. For example, a camera can be provided and include a motor that is configured to pivot the camera about an axis to capture images over a scan range.

In the context of a retail store security environment, remote data communication system 160 can comprise a security or command center configured to receive video data from one or more mobile video acquisition devices worn by security personnel and/or one or more video acquisition devices that are mounted within the retail store environment. For instance, video acquisition devices can include surveillance cameras mounted to a ceiling, wall, and/or support within a retail store.

Further, in one embodiment remote data communication system 160 is configured to provide a control signal to local data communication system 120 to control at least one data acquisition and/or transmission function within system 100. For example, a control signal can include a signal for activating and/or deactivating image acquisition component 112. In this manner, a user at remote data communication system 160 can remotely turn on image acquisition component 112. Further, a control signal can also be provided to activate and/or deactivate audio acquisition component 114 and/or speaker 116.

Figure 2:
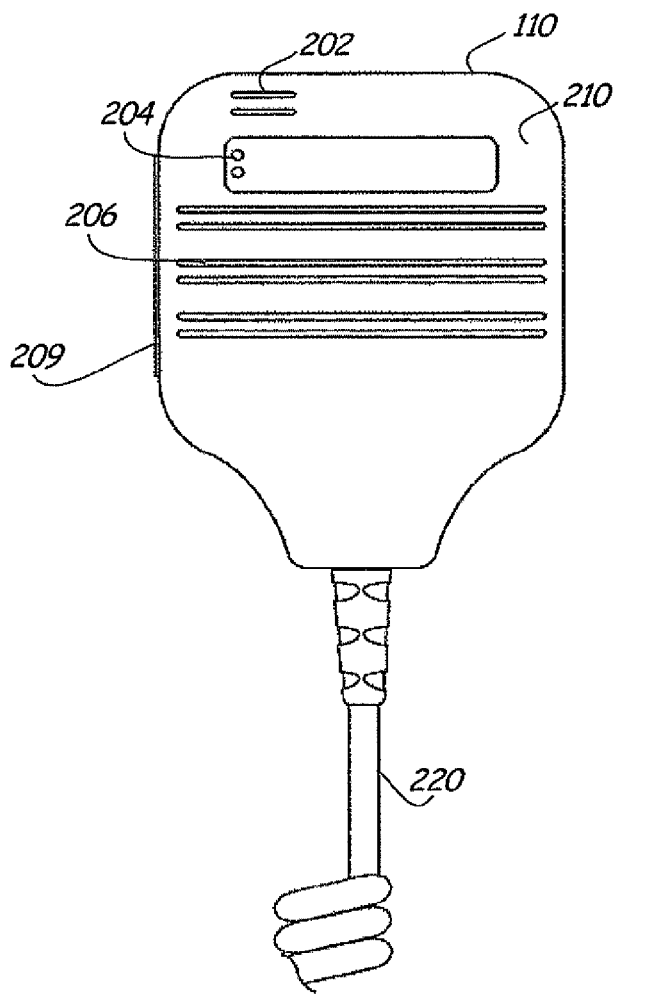
FIG. 2 illustrates an exterior of one embodiment of the system of FIG. 1 for acquiring image and audio data.
Figure 2:
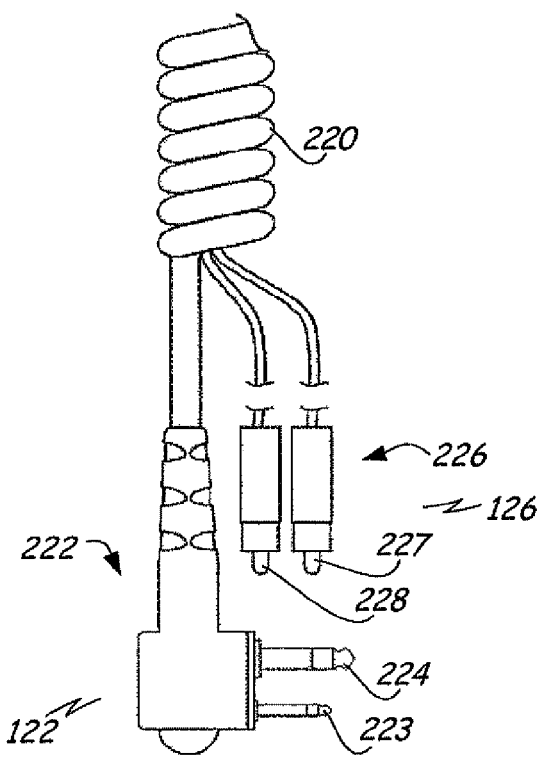
Figure 3:
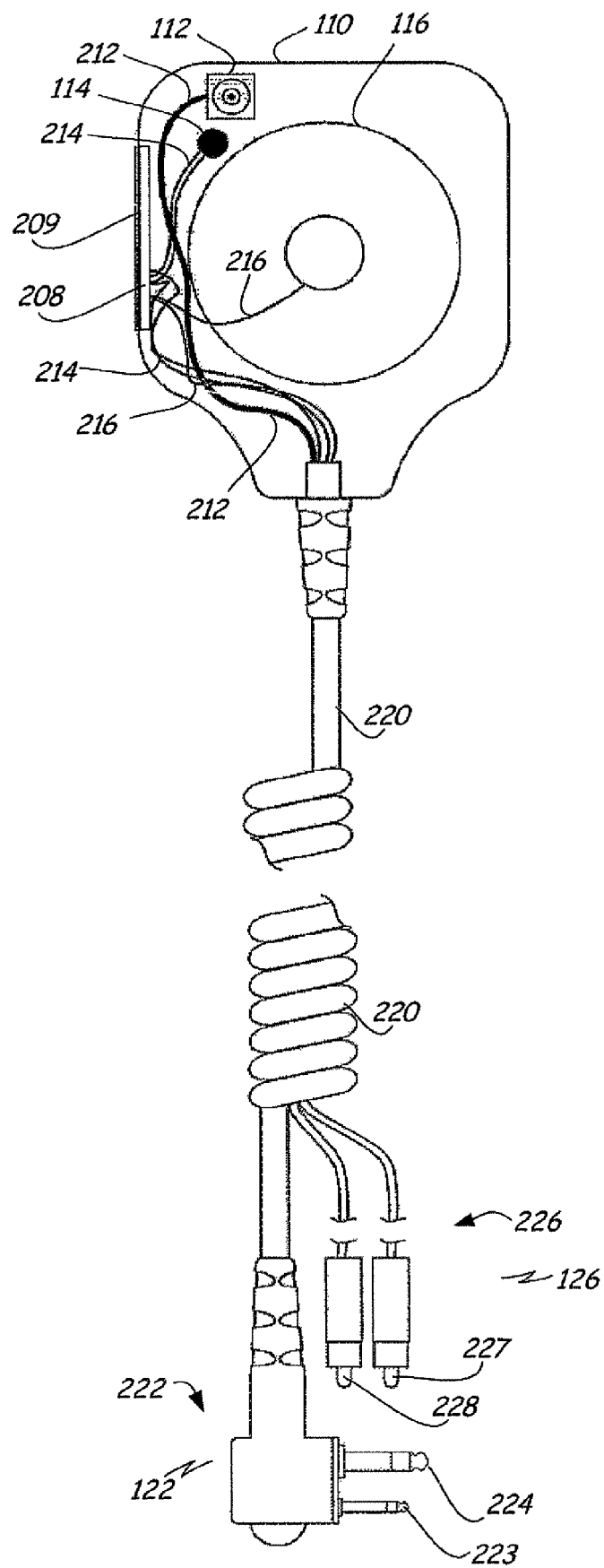
FIG. 3 illustrates the embodiment of FIG. 2 showing the interior of the system for acquiring image and audio data.

FIGS. 2 and 3 illustrate one embodiment of housing 110 and communication channels 122 and 126. FIG. 2 is an exterior front view of housing 110 and communication channels 122 and 126. FIG. 3 illustrates the interior of housing 110 with a cover 210 of housing 110 removed.

In the embodiment of FIGS. 2 and 3 communication channels 122 and 126 are wired connections between elements in housing 110 and local data communication system 120. The wires providing these connections pass through a conduit 220 (illustratively a coiled tube) and end at connection assemblies 222 and 226. Connection assemblies 222 and 226 are configured to couple to corresponding assemblies in system 120.

Image acquisition component 112 (illustratively a camera) is mounted within housing 110. As illustrated in FIG. 2, a cover 210 of housing 110 includes an opening 202 through which optical signals (i.e., light) enter the housing 110. Electrical signals generated by image acquisition component 112 are provided to system 120 through a conductor in electrical conductor bundle 212 that passes through conduit 220 and electrically connects component 112 to a connector 227 in connector assembly 226 configured to be coupled to system 120. A second conductor in electrical conductor bundle 212 connects connector 228 of assembly 226 and camera 112, and provides electrical power from system 120 to camera 112. In the illustrated embodiment, connectors 227 and 228 are RCA connectors. In another embodiment, connectors 227 and 228 are BNC connectors, or any other suitable connector. For example, connectors 227 and 228 can be configured to couple to system 120 utilizing a twist-lock mechanism.

Audio acquisition component 114 (illustratively a microphone) is also mounted within housing 110. As illustrated in FIG. 2, cover 210 of housing 110 includes an opening 204 through which audio signals enter housing 110. Electrical signals generated by audio acquisition component 114 are provided to system 120 through a conductor 214 that passes through conduit 220. Conductor 214 electrically connects component 114 to a connector 223 in connector assembly 222 configured to be coupled to system 120. In the illustrated embodiment, conductor 214 is connected through a control mechanism 208 that includes switches to enable/disable a connection between component 114 and connector 223. In the illustrated embodiment, control mechanism 208 includes a push button 209 and is configured to control transmission of signals from component 114. For instance, when the button 209 is depressed, control mechanism 208 enables the transmission of electrical signals from component 114 to system 120. Control mechanism 208 is configured to disable transmission of electrical signals from component 114 when the button 209 is released. In this manner, control mechanism 208 can operate component 114 in a push-to-talk (PTT) configuration.

Further, a speaker 116 is mounted within housing 110. As illustrated in FIG. 2, cover 210 of housing 110 includes an opening 206 through which audio signals generated by speaker 116 emanate from housing 110. Electrical signals are provided from system 120 to connector 224 in connector assembly 222. A conductor 216 passes through conduit 220 and electrically connects connector 224 and speaker 116. In the illustrated embodiment, conductor 216 is connected through control mechanism 208 that includes switches to enable/disable a connection between component 116 and connector 224. As discussed above, control mechanism 208 can include a push button 209 and is configured to control transmission of signals. When button 209 is depressed, control mechanism 208 disables the transmission of electrical signals from system 120 to speaker 116. Further, control mechanism 208 can be configured to enable transmission of electrical signals to speaker 116 when button 209 is released. In this manner, control mechanism 208 can operate speaker 116 in a push-to-talk (PTT) configuration.

Additionally, a power supply conductor and ground can be provided to microphone 114 and/or speaker 116. The power supply conductor and ground can be connected to portions of connector 223 and/or connector 224. Alternatively, an additional connector can be provided in connector assembly 222.

Figure 4:
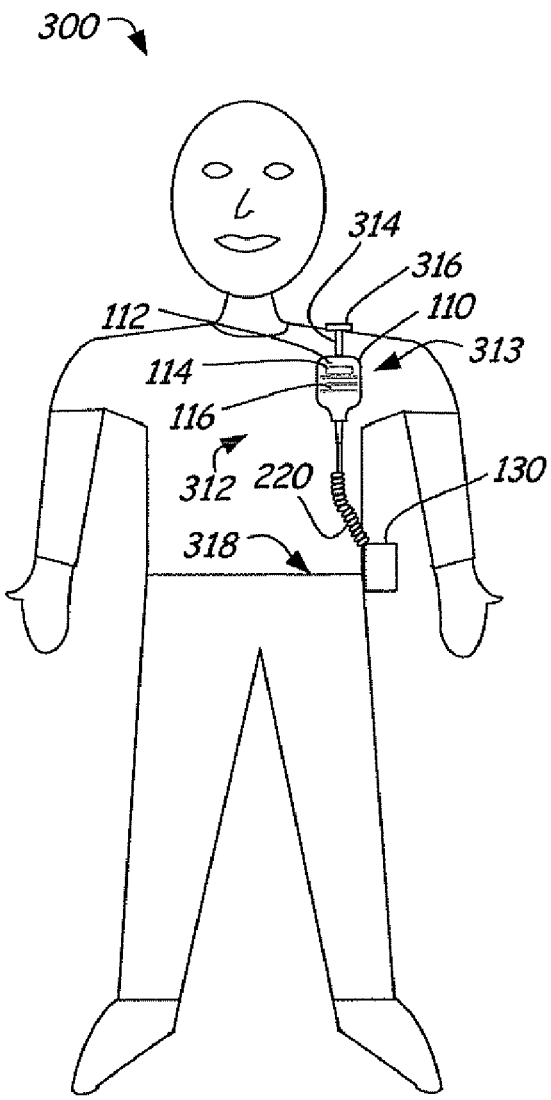
FIG. 4 illustrates a front view of a user wearing the system of FIGS. 2 and 3, under one embodiment.
Figure 5:
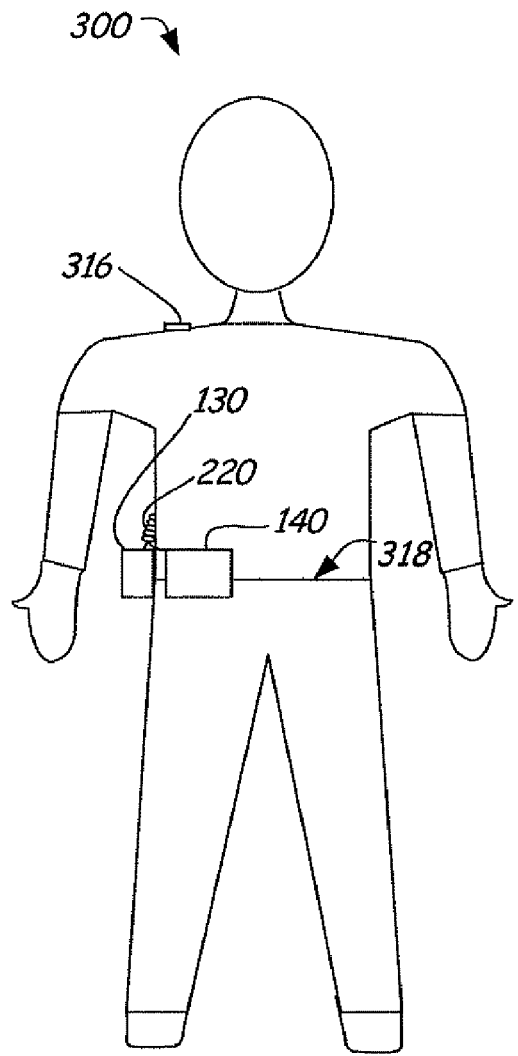
FIG. 5 illustrates a back view of a user wearing the system of FIGS. 2 and 3, under one embodiment.

FIGS. 4 and 5 illustrate an exemplary embodiment wherein the system illustrated in FIGS. 2 and 3 is worn by a user 300. FIG. 4 is a front view of user 300 and FIG. 5 is a rear view of user 300. Housing 110 is configured to be positioned on a portion of the body of user 300. As illustrated, housing 110 is positioned upon a torso 312 of user 300 such that optical signals are received by camera 112 from a scene that is in front of the user 300. In this manner, camera 112 captures images from a similar visual perspective (i.e., a similar viewpoint) as user 300. The housing 110 can be oriented such that optical signals are received by camera 112 along an optical axis that is substantially horizontal. In many applications, it is especially advantageous to acquire image data from the viewpoint of the user. For instance, in a security or law enforcement application, user 300 can utilize camera 112 to acquire visual data of a criminal activity or an interaction with a subject. The acquired visual data can be utilized to ascertain the context of an event and the conduct of a subject (i.e., a shoplifter, a criminal suspect, etc.) as well as the actions of user 300 in responding to the event.

Further, in addition to acquiring image data from an area viewable by the user, housing 110 is positioned in sufficient proximity to the user's ears and mouth such that the user 300 can readily access the housing for audio communication. For example, in one embodiment the housing 110 is positioned on an area of the user such that the user can speak into microphone 114 and hear audio signals produced by speaker 116 without being required to move housing 110 or speak in an excessively loud manner. In the illustrated embodiment, a fastener 314, such as a strap, is coupled to housing 110 to locate housing 110 in a suitable position on the body of user 300. As illustrated housing 110 is positioned over a chest 313 of the user. Fastener 314 is coupled to a fastener 316, such as a loop or other suitable fastener, located on a portion of the user's clothing. In the illustrated embodiment, fastener 316 is positioned on a shoulder portion of user 300. Fastener 314 provides support for positioning housing 110 in an orientation that enables user 300 to readily communicate with microphone 114 and speaker 116 and that enables camera 112 to capture image data from a scene that is viewable by the user (e.g., in front of user 300).

Audio data communication element 130 and image data communication element 140 are positioned on a portion of the user that is spaced apart from housing 110. In the illustrated embodiment, components 130 and 140 are positioned proximate a waist 318 of user 300. In one embodiment, components 130 and 140 are spaced apart upon the body of user 300 such that the weight of components 130 and 140 is distributed about the body of user 300. For instance, in one embodiment components 130 and 140 are positioned on opposing sides of the body of user 300. It is noted that while components 130 and 140 are illustrated as comprising separate enclosures, components 130 and 140 can be provided in a single enclosure.

Figure 6:
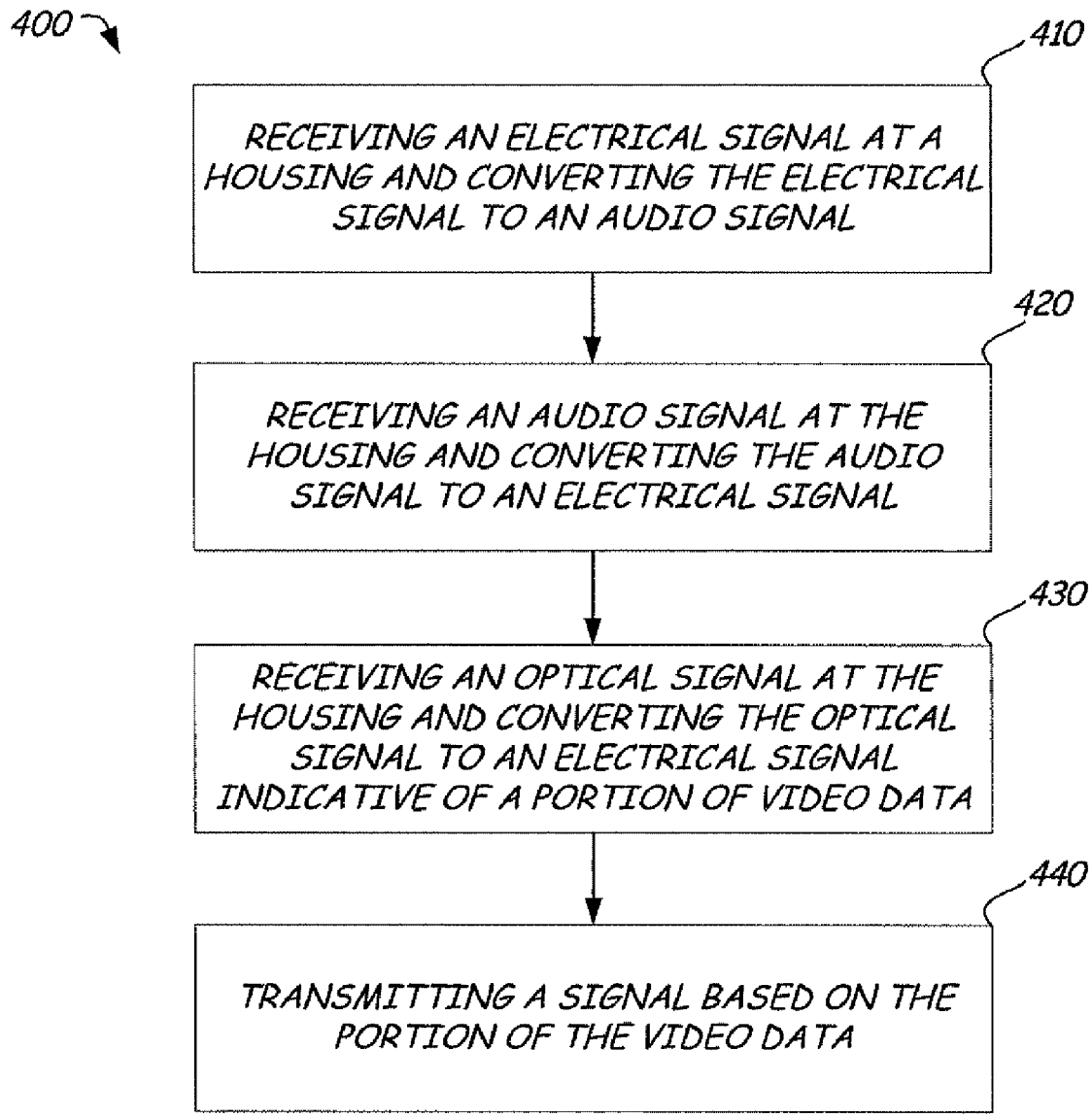
FIG. 6 illustrates a method of acquiring audio and image data, under one embodiment.

FIG. 6 illustrates a method 400 for acquiring audio and image data, under one embodiment. Method 400 will be discussed below in the context of the system of FIG. 1. However, the method 400 can be utilized in the context of many other audio/video acquisition system types and configurations.

At step 410, an electrical signal is received at a housing. The electrical signal is converted to an audio signal indicative of the received electrical signal. For example, in the context of the system illustrated in FIG. 1, audio data is received at a local data communication system 120 from a remote data communication system 160. The audio data is transmitted from local data communication system 120 to a speaker 116 at housing 110. Speaker 116 generates an audio signal from the electrical signal.

At step 420, an audio signal is received at the housing. An electrical signal is generated indicative of the received audio signal. For example, in the context of the system illustrated in FIG. 1, audio acquisition system 114 receives an audio signal and generates an electrical signal that is transmitted to local data communication system 120. Local data communication system 120 can further be configured to transmit audio data to remote data communication system 160.

At step 430, an optical signal (i.e., light) is received at the housing. An electrical signal is generated indicative of the received optical signal. For example, in the context of the system illustrated in FIG. 1, light is received at image acquisition component 112 and component 112 generates an electrical signal indicative of the received light. In the illustrated embodiment, the electrical signal generated at step 430 is indicative of a portion of video data.

At step 440, a signal is transmitted based on the portion of video data. For example, in one embodiment of step 440 a signal is transmitted based on a first portion of video data while additional video data is acquired. In this manner, a real-time, or substantially real-time, video stream can be provided. For example, in the context of the system illustrated in FIG. 1, image acquisition component 112 generates an electrical signal that includes a first portion of video data. The first portion of video data is provided to local data communication system 120, which is configured to transmit the video data to remote data communication system 160. Alternatively, or additionally, local data communication system 120 can be configured to store the video data at storage component 144. Further, image acquisition component 112 acquires a second portion of video data while the first portion of video data is being transmitted and/or stored by local data communication system 120.

In accordance with one embodiment of method 400, the steps of receiving the optical signal at the housing and converting the optical signal to an electrical signal occur continuously and concurrently with the steps of receiving an electrical signal at the housing and converting the electrical signal into an audio signal. In this manner, the method 400 can obtain and transmit image data while simultaneously receiving audio data and generating an audio signal. For example, in the context of FIG. 1, system 100 can be configured such that image acquisition component 112 acquires optical signals and generates an electrical signal indicative of the optical signal in a continuous manner. Audio data can be transmitted to speaker 116 and speaker 116 can generate an audio signal without interrupting the receipt and transmission/storage of image data.

Figure 7:
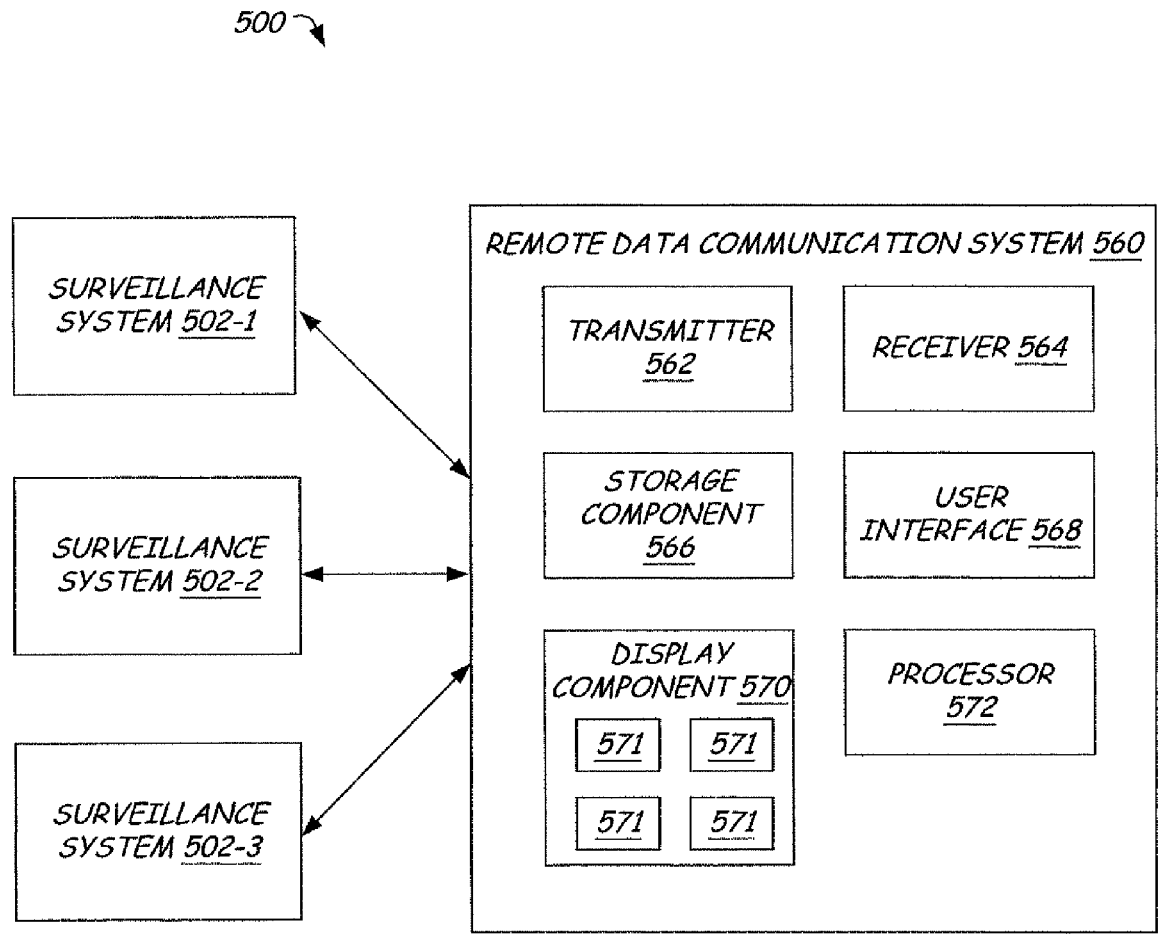
FIG. 7 is a schematic diagram illustrating a system for implementing a plurality of surveillance systems configured to transmit audio and image data.

FIG. 7 is a schematic diagram illustrating one embodiment of a system 500 including a remote data communication system 560, such as remote data communication system 160 illustrated in FIG. 1. Remote data communication system 560 is configured to communicate with a plurality of surveillance systems 502-1, 502-2, 502-3 (collectively referred to as surveillance systems 502). One or more of systems 502 are configured to communicate audio data with remote data communication system 560. For example, one or more of systems 502 can be configured to provide two-way audio communication with remote data communication system 560. Further, one or more of systems 502 can be configured to acquire image data from an environment surrounding the particular system 502. For example, each system 502 can be configured to acquire video data and transmit the video data to remote data communication system 560. While system 500 is illustrated as including three surveillance systems, any number of systems 502 can be utilized.

In one embodiment, one or more of systems 502 are mobile audio/video surveillance and communication systems configured to be worn by a user, such as security or law enforcement personnel. For example, one or more of systems 502 can be substantially similar to system 100 illustrated in FIG. 1. Further, one or more of systems 502 can be fixed surveillance components configured to acquire video. For example, one or more of systems 502 can comprise video surveillance cameras mounted to a stationary structure to have an elevated viewpoint within a retail environment. For instance, video surveillance cameras can be mounted to a wall, a ceiling, a floor, post, and/or a support associated with the retail environment. Further, a video surveillance camera can include a motor configured to pivot the camera about an axis over a scan range.

In one embodiment, remote data communication system 560 includes a transmitter module 562 configured to transmit data directly to systems 502 and a receiver module 564 configured to receive data directly from systems 502. In this manner, data is transmitted directly between systems 502 and remote data communication system 560 without requiring the transmitted data to be processed and/or transmitted by an intermediary device or channel.

Transmitter module 562 can include a plurality of transmitters or a single transmitter that is able to communication on multiple channels or a single transmitter that is able to transmit to multiple receivers along a single channel. Similarly, receiver module 564 can include a plurality of receivers or a single receiver that can communicate on multiple channels or a single receiver that can receive signals from multiple transmitters along a single channel. Under one exemplary embodiment, a separate transmitter and receiver are provided to communicate with each of systems 502-1, 502-2, and 502-3. Under a different exemplary embodiment, a single transmitter and a single receiver is used to communicate with systems 502-1, 502-2, and 502-3 using data packets that include header information that identify a particular system. For instance, a data packet can include header information indicating that the data packet is being sent to system 502-1 or a data packet can include header information indicating that the data packet is being sent by system 502-1. In further embodiments, a first transmitter and a first receiver can be configured to communicate audio data and a second transmitter and a second receiver can be configured to communicate video data. In many embodiments, receiver module 564 is able to receive video data from multiple systems 502-1, 502-2, and 502-3 simultaneously. For embodiments using data packets, such simultaneous reception includes receiving a series of data packets from one system that are interlaced with a series of data packets from another system.

Image data and/or audio data received by remote data communication system 560 can be stored in a storage component 566. For example, a digital video recorder can be provided to store video data. The storage component 566 can be configured to archive the received data. Examples include annotating the data with a time/date stamp and associating, with the data, an identifier indicating from which system 502 the data was received.

Remote data communication system 560 also includes a user interface 568 configured to enable user interaction with system 560. For example, a user can indicate whether to store the received data, visually render the image data, etc. Additionally, interface 568 includes a microphone and speaker for enabling audio communication with at least one of systems 502. For instance, audio data received from systems 502 can be audibly rendered by the speaker. Further, the microphone can be utilized by a user to input speech to be communicated to at least one of systems 502.

Further, remote data communication system 560 can be configured to visually render the image data received from systems 502. For example, a display component 570 can be provided and include one or more monitors 571. In one embodiment, video data from each system 502-1, 502-2, 502-3, is rendered to a separate monitor 571. In another embodiment, video data from a plurality of systems 502 is visually rendered to the same monitor 571. For example, video data from multiple systems 502 can be provided on separate portions of a single monitor 571. In another embodiment, video data from one of systems 502 can be overlaid on video data from another of system 502.

A processor 572 can be provided and operate to control display of the video data on display component 570. For example, processor 572 can provide the video data from systems 502 to the one or more monitors 571. In one instance, processor 572 is configured to render video data based on a user input at interface 568, such as a user selection of one of systems 502. To illustrate, a user can indicate one or more of systems 502 for which to display video. Processor 572 obtains and renders the video data based on the user indication. Further, processor 572 can associate identifier information such as a time and date to the video data.

In another embodiment, remote data communication system 560 is configured to provide a control signal to at least one of systems 502. The control signal can be in response to a user input at interface 568 and can include a command to activate and/or deactivate a data acquisition function within one or more of systems 502. For example, a command can be sent to a surveillance system 502 to activate or deactivate video acquisition.

Figure 8:
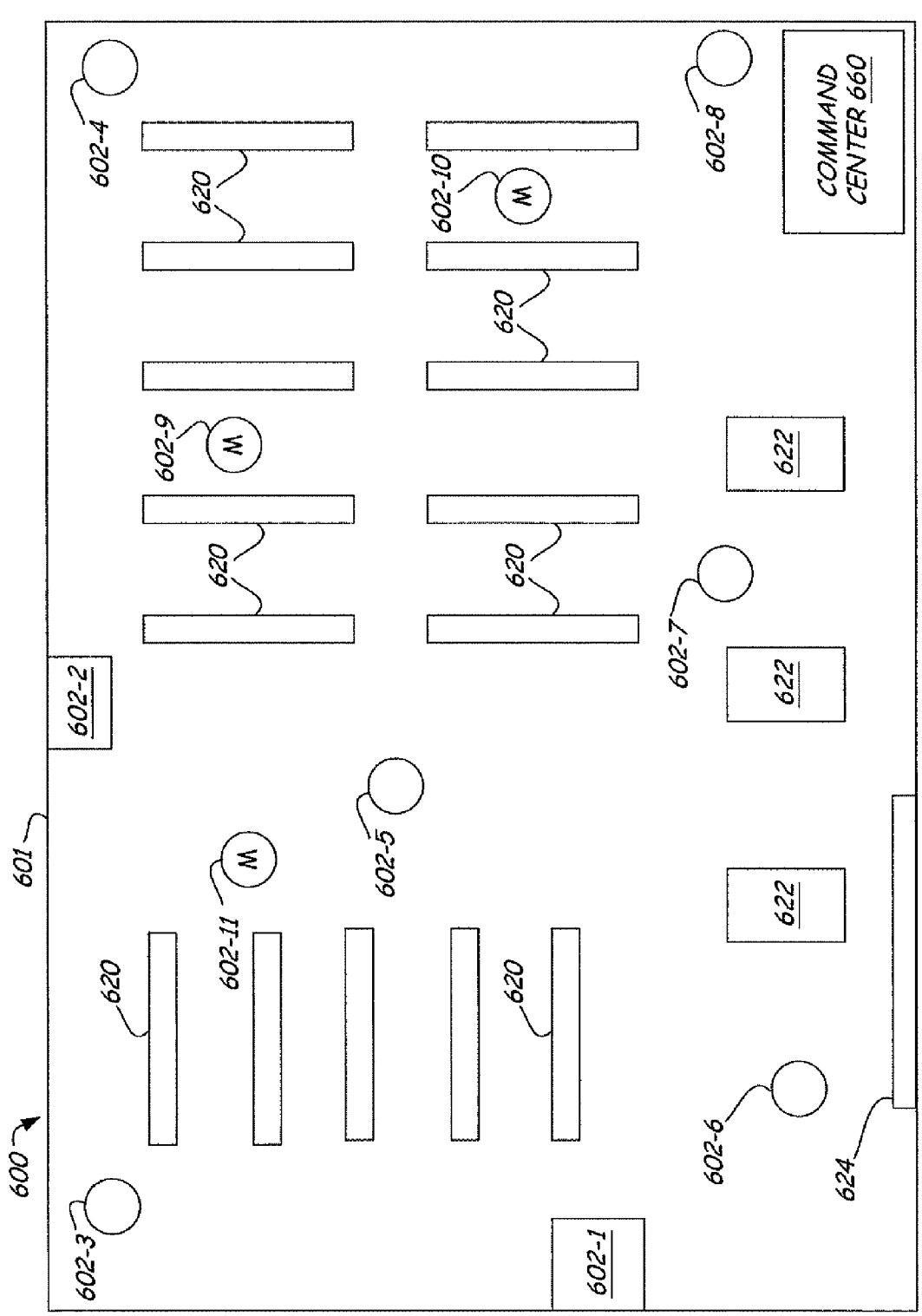
FIG. 8 is a plan view of one embodiment of an environment including a plurality of surveillance components.

FIG. 8 illustrates a system 600 that includes a plurality of surveillance components configured to acquire video data. In one embodiment, system 600 is substantially similar to system 500 illustrated in FIG. 7. System 600 is illustrated within a retail store environment 601. Environment 601 can include a structure such as a building or portion thereof. However, it should be understood that system 600 is useful in other applications including, but not limited to, residential, business, and/or industrial environments. For instance, environment 601 can include a manufacturing facility or a warehouse.

As illustrated, system 600 includes surveillance components 602-1, 602-2, 602-3, 602-4, 602-5, 602-6, 602-7, 602-8, 602-9, 602-10, and 602-11 (collectively referred to as surveillance components 602). However, it is noted that system 600 can employ any number of surveillance components 602. One or more surveillance components 602 are substantially similar to surveillance systems 502 illustrated in FIG. 7 and are configured to acquire video data within environment 601.

One or more of surveillance components 602 are configured to communicate audio data with a command center 660. Command center 660 is illustratively similar to remote data communication system 560, illustrated in FIG. 7. For example, one or more components 602 can be configured for two-way radio communication with command center 660. Further, one or more of components 602 can be configured to acquire image data from an environment surrounding the particular component 602. For example, one or more components 602 can be configured to acquire video data and transmit the video data to command center 660. It is noted that in some embodiments video data can be stored locally at components 602.

In one embodiment, one or more of surveillance components 602 are provided at an elevated viewpoint within environment 601. For example, one or more of surveillance components 602 are fixed components mounted to a stationary structure within environment 601. As illustrated, components 602-1 and 602-2 comprise cameras mounted to a wall of environment 601. Further, components 602-3, 602-4, 602-5, 602-6, 602-7 and 602-8 comprise cameras mounted to a ceiling or structure supported by a floor of environment 601. In one embodiment, the cameras can be provided on a support structure, such as a post. In some embodiments the cameras are stationary and in other embodiments, the cameras include a motor configured to pivot the camera about an axis from side-to-side through a pre-determined scan range. As illustrated, the surveillance components 602 can be provided near points of interest such as shelves or racks 620 for displaying goods and/or checkout stations 622. One goal of surveillance components 602 includes recording video in an attempt to prevent and visually capture activities such as shoplifting.

Although system 600 includes a plurality of fixed surveillance components 602 mounted to structures within environment 601, areas within environment 601 may nevertheless be blocked from the view of the surveillance components 602. For example, shelves and racks 620 as well as goods, products, walls, etc. can create "dark areas" within environment 601 which are shielded from the field of view of the surveillance components mounted within environment 601 (i.e., components 602-1, 602-2, 602-3, 602-4, 602-5, 602-6, 602-7 and 602-8). As such, one embodiment of system 600 includes one or more mobile surveillance components 602-9, 602-10, and 602-11. As illustrated, components 602-9, 602-10, and 602-11 are mobile surveillance devices configured to be worn by a user, such as security personnel. In one embodiment, components 602-9, 602-10, and 602-11 are substantially similar to system 100 illustrated in FIG. 1. Components 602-9, 602-10, and 602-11 are provided at a viewpoint within environment 601 that is lower than the elevated viewpoint of the surveillance components 602 mounted to a structure within environment 601 (i.e., 602-1, 602-2, 602-3, 602-4, 602-5, 602-6, 602-7, 602-8). The mobile surveillance devices 602-9, 602-10, 602-11 can be utilized by security personnel to acquire video in the "dark areas" of environment 601 and to acquire video from a point-of-view of the security personnel.

As discussed above, in one embodiment command center 660 is substantially similar to remote data communication system 560. In this embodiment, command center 660 can include transmitters and receivers for communicating audio and/or video data with components 602. Command center 660 can include a user interface, such as user interface 568, for enabling user interaction with system 600. Further, command center 660 can include a display component, such as display component 570.

Further, in one embodiment command, center 660 is configured to provide a control signal to one or more of components 602. The control signal can be in response to a user input and can include a command to activate and/or deactivate a data acquisition function within one or more of systems 602. For example, a command can be sent to a surveillance component 602 to activate or deactivate video acquisition.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for acquiring video data within an environment, the system comprising: a device including an image acquisition component, an audio acquisition component, a speaker, and a control interface all provided within an enclosure that is configured to be mounted to a portion of a user, wherein the image acquisition component is configured to be utilized to acquire video data from a first viewpoint within the environment; a local data communication system configured to be mounted to the person and to receive an electrical signal indicative of video data from the image acquisition component and configured to transmit video data; a surveillance component that is fixed to a structure within the environment and configured to acquire video data from a second viewpoint within the environment that is elevated with respect to the first viewpoint, wherein the environment includes one or more objects, which block dark areas behind the objects from the second viewpoint, and the first viewpoint is mobile and configured to periodically access the dark areas; and a remote data communication system that is remote from the device and configured to simultaneously receive video data from the local data communication system and video data from the surveillance component; wherein: the image acquisition component collects video data independently from the collection of audio data by the audio acquisition component, the controller interface permits the user to independently turn on and off each of video data acquisition by the image acquisition component and audio data acquisition by the audio acquisition component.

2. The system of claim 1, wherein the local data communication system is configured to receive an electrical signal indicative of audio data from the audio acquisition component and to transmit an electrical signal indicative of audio data to the speaker, wherein the local data communication system is configured for two-way communication of audio data with the remote data communication system.

3. The system of claim 1, and further comprising a plurality of surveillance components that are fixed to one or more structures within the environment, wherein the plurality of surveillance components are configured to acquire video data from the environment at viewpoints that are elevated with respect to the first viewpoint.

4. The system of claim 1, and further comprising at least one additional device configured to be mounted to a portion of a user and utilized to acquire video data, wherein the remote data communication system is remote from the at least one additional device and configured to receive video data acquired by the at least one additional device.

5. The system of claim 1, wherein the structure is one of a group comprising a ceiling, a wall, and a post associated with a building.

6. The system of claim 5, wherein the first viewpoint is proximate a torso of the user.

7. The system of claim 1, wherein the remote data communication system includes a display component configured to visually render video data received from the local data communication system and the surveillance component at the same time.

8. The system of claim 1, wherein the remote data communication system is configured to visually render video data received from the local data communication system and the surveillance component while the remote data communication system receives additional video data from the local data communication system and the surveillance component.

9. The system of claim 1, wherein the local data communication system includes an image data communication element configured to transmit video data to the remote data communication system and an audio data communication element configured to receive audio data from the remote data communication system, wherein the image data communication element and the audio data communication element are configured to transmit video data and receive audio data concurrently.

10. The system of claim 1, wherein the local data communication system is configured to receive an electrical signal from the image acquisition component indicative of a first portion of video data, and wherein the local data communication element is configured to transmit the first portion of video data to the remote data communication system while the local data communication system receives a second electrical signal from the image acquisition component indicative of a second portion of video data.

11. The system of claim 1, wherein the local data communication system is configured to simultaneously receive the electrical signal indicative of video data from the image acquisition component and transmit an electrical signal indicative of audio data to a speaker provided in the enclosure.

12. A system for acquiring video data within an environment, the system comprising: a device including an image acquisition component, an audio acquisition component, and a speaker provided within an enclosure that is configured to be mounted to a portion of a user, wherein the image acquisition component is configured to be utilized to acquire video data from a first viewpoint within the environment; a local data communication system configured to receive an electrical signal indicative of video data from the image acquisition component and configured to transmit video data; a surveillance component that is fixed to a structure within the environment and configured to acquire video data from a second viewpoint within the environment that is elevated with respect to the first viewpoint, wherein the environment includes one or more objects, which block dark areas behind the objects from the second viewpoint, and the first viewpoint is mobile and configured to periodically access the dark areas; and a remote data communication system that is remote from the device and configured to simultaneously receive video data from the local data communication system and video data from the surveillance component; wherein the remote data communication system is configured to transmit a control signal to the local data communication system to turn on and off data acquisition performed by the image acquisition component.

13. A system located within an environment, the system comprising: a first video acquisition device that is a mobile device configured to be mounted to a portion of a user, wherein the mobile device includes a first video acquisition component provided in an enclosure and configured to acquire a first portion of video data, and wherein the mobile device includes a first transmitter configured to transmit the first portion of video data, and wherein the mobile device includes an audio acquisition device and a speaker that are provided in the enclosure; a second video acquisition device having a fixed position and including a second image acquisition component configured to acquire a second portion of video data and a second transmitter configured to transmit the second portion of video data, wherein the environment includes one or more objects, which block dark areas behind the objects from being visually captured by the second video acquisition device, and the first video acquisition device is configured to be moved to periodically access the dark areas; and a station that is remote from the first and second video acquisition devices, wherein the station includes a receiver module having at least one receiver configured to receive the first portion of video data directly from the first transmitter and the second portion of video data directly from the second transmitter, and wherein the station includes a processing component configured to receive the first and second portions of video data and visually render the first and second portions of video data on a display component at the same time; wherein the station is configured to transmit a first control signal to the first video acquisition device to control a video data acquisition operation of the first video acquisition device, wherein the first control signal includes a command to activate the first video acquisition component to begin capturing the video data and to transmit the first portion of the video data to the station.

14. The system of claim 13, wherein the mobile device is configured for two-way radio communication of audio data with the station, and the mobile device is configured to only transmit the audio data upon user activation switching the mobile device from an audio data reception mode to an audio data transmission mode.

15. The system of claim 13, wherein the second video acquisition device is a fixed surveillance camera.

16. A system for acquiring video data within a retail structure, the system comprising:
a mobile device including a camera, a microphone, and a speaker that are provided within an enclosure that is configured to be mounted to a portion of a user, wherein the camera is configured to be utilized to acquire video data from a first viewpoint within the retail structure;
a local data communication system configured to receive an electrical signal indicative of video data from the camera, wherein the local data communication system includes a first transmitter configured to transmit video data acquired by the camera;
a surveillance component that is fixed within the retail structure and configured to acquire video data from a second viewpoint within the retail structure that is elevated with respect to the first viewpoint, wherein the surveillance component includes a second transmitter configured to transmit video data acquired by the surveillance component, the retail structure includes one or more of shelves and racks, which block dark areas behind the shelves and racks from the second viewpoint, and the first viewpoint is mobile and configured to periodically access the dark areas; and
a remote data communication system that is located within the structure and is remote from the mobile device and the surveillance component, the remote data communication system including a receiver module having at least one receiver configured to simultaneously receive video data directly from the local data communication system and video data directly from the surveillance component, and wherein the local data communication system is configured for two-way communication of audio data with the remote data communication system.

17. The system of claim 16, wherein the remote data communication system receives a first portion of video data from the first transmitter and a second portion of video data from the second transmitter, wherein the remote data communication system is configured to visually render the first and second portions of video data to a display component while the remote data communication system receives additional video data from the first and second transmitters.

18. The system of claim 16, wherein the remote data communication system is configured to transmit a control signal to the mobile device to control a data acquisition operation of the camera, wherein the control signal includes a command to activate the camera to initiate capturing of the video data.

19. The system of claim 16, wherein the command to activate the camera turns the camera on, and the remote data communication system is configured to provide a second control signal including a second command to turn off the camera.

20. The system of claim 1, wherein:
the enclosure is in the form of a handheld radio and is mounted to a shirt over a chest area of the person, and
the audio acquisition component functions independently of the video acquisition component and only acquires the audio data when a corresponding button of the control interface is depressed.

21. The system of claim 1, wherein the device includes a push button to initiate the audio acquisition component to capture audio data and transmit the audio data to the remote data communication system, and the push button is characterized by an inability to control the image acquisition component.

* * * * *